(12) United States Patent
Tamaki et al.

(10) Patent No.: US 11,661,932 B2
(45) Date of Patent: May 30, 2023

(54) VEHICLE-MOUNTED DEVICE

(71) Applicant: MITSUBISHI HEAVY INDUSTRIES THERMAL SYSTEMS, LTD., Tokyo (JP)

(72) Inventors: Hitoshi Tamaki, Tokyo (JP); Ichiro Yogo, Tokyo (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 92 days.

(21) Appl. No.: 16/069,009

(22) PCT Filed: Mar. 6, 2017

(86) PCT No.: PCT/JP2017/008848
§ 371 (c)(1),
(2) Date: Jul. 10, 2018

(87) PCT Pub. No.: WO2017/154853
PCT Pub. Date: Sep. 14, 2017

(65) Prior Publication Data
US 2019/0023105 A1 Jan. 24, 2019

(30) Foreign Application Priority Data
Mar. 11, 2016 (JP) .............................. JP2016-047910

(51) Int. Cl.
*F04B 39/12* (2006.01)
*F04B 53/16* (2006.01)

(52) U.S. Cl.
CPC ............ *F04B 39/121* (2013.01); *F04B 39/12* (2013.01); *F04B 53/16* (2013.01); *F04C 2240/30* (2013.01)

(58) Field of Classification Search
CPC ........ F04B 39/121; F04B 39/12; F04B 53/16; F04C 2240/30
See application file for complete search history.

(56) References Cited

U.S. PATENT DOCUMENTS 2,013,862 A * 9/1935 Schulz .................... F04B 3/003
417/463
2,093,295 A * 9/1937 Teeter ..................... F25B 31/00
417/248

(Continued)

FOREIGN PATENT DOCUMENTS

CN  2935603     *  8/2007  ............... H02K 5/04
CN  2935603 Y    8/2007

(Continued)

OTHER PUBLICATIONS

Maier, "Design Guides for Plastics", 2009, pp. 7-8.*

(Continued)

*Primary Examiner* — Christopher S Bobish
(74) *Attorney, Agent, or Firm* — Birch, Stewart, Kolasch & Birch, LLP

(57) ABSTRACT

A housing structure for a device to be mounted on a vehicle is provided with which strength for withstanding a collision can be ensured. An electric compressor (1), which is a device to be mounted on a vehicle, is equipped with a device main body (10), and a cylindrical housing (13) provided in a vehicle and on the inside of which the device main body (10) is accommodated. A protruding portion (20) protruding radially outward is formed on a cylindrical part (15) constituting the housing (13). A cross section of the protruding portion (20) orthogonal to an axial line (15L) of the cylindrical part (15) presents an arc-like shape or a substantially arc-like shape protruding outward in the radial direction.

17 Claims, 13 Drawing Sheets

(56) References Cited

U.S. PATENT DOCUMENTS

| | | | | |
|---|---|---|---|---|
| 2,863,255 | A * | 12/1958 | Slipka | A01K 97/05 |
| | | | | 43/57 |
| 3,272,136 | A * | 9/1966 | Franzen | H02K 5/132 |
| | | | | 417/422 |
| 3,356,293 | A * | 12/1967 | Butts | F25B 31/006 |
| | | | | 417/312 |
| 4,548,558 | A * | 10/1985 | Sakamaki | F01C 21/10 |
| | | | | 418/101 |
| 4,998,761 | A | 3/1991 | Bayer et al. | |
| 5,112,190 | A * | 5/1992 | Kajiwara | F04D 29/4266 |
| | | | | 415/215.1 |
| 5,178,758 | A * | 1/1993 | Hwang | C02F 9/005 |
| | | | | 210/256 |
| 5,401,146 | A * | 3/1995 | Moriya | F04D 29/167 |
| | | | | 417/423.14 |
| 5,494,418 | A * | 2/1996 | Moriya | F04D 29/167 |
| | | | | 417/423.14 |
| 8,342,826 | B2 * | 1/2013 | Fujita | F04C 2/3441 |
| | | | | 418/26 |
| 8,796,889 | B2 * | 8/2014 | Arashi | B60H 1/3229 |
| | | | | 307/326 |
| 8,974,197 | B2 * | 3/2015 | VanBritson | F01C 21/10 |
| | | | | 417/423.14 |
| 9,068,458 | B2 * | 6/2015 | Ota | F01C 21/10 |
| 2006/0239843 | A1 | 10/2006 | Iguchi et al. | |
| 2010/0101269 | A1 | 4/2010 | Theodore, Jr. et al. | |
| 2012/0045352 | A1 * | 2/2012 | Lawyer | F04D 29/445 |
| | | | | 417/410.1 |
| 2012/0251356 | A1 | 10/2012 | Ota et al. | |
| 2015/0044075 | A1 | 2/2015 | Abe et al. | |
| 2016/0201671 | A1 * | 7/2016 | Moeser | F01C 21/10 |
| | | | | 418/259 |
| 2016/0214577 | A1 * | 7/2016 | Otani | F04D 29/486 |
| 2019/0331116 | A1 * | 10/2019 | Di Sante | F04C 29/065 |

FOREIGN PATENT DOCUMENTS

| | | |
|---|---|---|
| CN | 200975472 Y | 11/2007 |
| CN | 104246223 A | 12/2014 |
| CN | 104924854 A | 9/2015 |
| DE | 60 2006 000 208 T2 | 8/2008 |
| DE | 10 2009 045 966 A1 | 6/2010 |
| JP | 4-224436 A | 8/1992 |
| JP | 5505352 B2 | 5/2014 |

OTHER PUBLICATIONS

Machine Translation of CN2935603.*

International Preliminary Report on Patentability and English translation of the Written Opinion of the International Searching Authority (Forms PCT/IB/338, PCT/IB/373 and PCT/ISA/237) for Application No. PCT/JP2017/008848, dated Sep. 20, 2018.

Chinese Office Action and Search Report, dated Jun. 2, 2020, for Chinese Application No. 201780006270.5, with an English translation.

German Office Action dated Nov. 20, 2020 in counterpart German Application No. 112017001264.3 with an English translation.

* cited by examiner

VEHICLE-MOUNTED DEVICE

TECHNICAL FIELD

The present invention relates to a housing of a device to be mounted on a vehicle.

BACKGROUND ART

On a vehicle, for example, a device is mounted in which a motor is embedded, such as an electric compressor for constituting an air conditioner. The electric compressor includes the motor, a compression mechanism that is operated via torque output from the motor, and a drive circuit unit for driving the motor. The motor and the compression mechanism are housed in a cylindrical housing, and the housing is integrated with the drive circuit unit (e.g., Patent Document 1).

In Patent Document 1, a part of a casing of the drive circuit unit is made thick in order to protect the drive circuit from impacts.

CITATION LIST

Patent Document

Patent Document 1: JP 5505352 B

SUMMARY OF INVENTION

Technical Problem

Assuming that a vehicle collides with an external object while traveling, there is a possibility that a member 9 of the vehicle will collide with the side surface of a housing 8 of an electric compressor (FIG. 13A). In such a case, as illustrated by the distribution of stress acting on the housing 8 in FIG. 13B, a large tensile stress is generated at a portion 85P on the rear side (inner periphery of the housing) of a part of the housing 8 with which the member 9 of the vehicle has collided. Once excessive deformation or damage of the housing 8 caused by the stress creates a gap between the housing 8 and a driver circuit unit, not illustrated, this may cause electric leakage of the driver circuit unit. Therefore, it is necessary to ensure the strength of the housing 8. However, conferring sufficient plate thickness to the housing 8 in order to ensure the strength is difficult due to constraints on installation space, constraints on weight, etc.

In light of the above, an object of the present invention is to provide a housing structure for a device to be mounted on a vehicle capable of ensuring strength against a collision.

Solution to Problem

A device to be mounted on a vehicle according to the present invention includes: a housing having a cylindrical shape to be mounted on the vehicle, and for housing a device main body; and the device main body, and a protruding portion that protrudes outward in a radial direction is disposed on a cylindrical part constituting the housing, and a cross-section of the protruding portion orthogonal to an axial line of the cylindrical part exhibits an arc-like shape or a substantially arc-like shape that protrudes outward in the radial direction.

In the device to be mounted on the vehicle according to the present invention, preferably, B/A is from 4 to 7, both inclusive, where A is a height to a tip end of the protruding portion measured in the radial direction of the cylindrical part, and B is a distance measured from the tip end of the protruding portion to a position of an end edge of the protruding portion in a direction of a tangential line drawn to the tip end.

In the device to be mounted on the vehicle according to the present invention, an interface portion between an end edge of the protruding portion and an outer peripheral surface of the cylindrical part preferably includes an R part having an arc-like shape that protrudes toward an inner peripheral side of the cylindrical part.

In the device to be mounted on the vehicle according to the present invention, a radius of the cylindrical part is preferably from 40 mm to 80 mm, both inclusive, and a radius of curvature of the R part is equal to or greater than 10 mm.

Furthermore, a device to be mounted on a vehicle according to the present invention includes: a housing having a cylindrical shape to be mounted on the vehicle, and for housing a device main body; and the device main body, and a protruding portion that protrudes outward in a radial direction is disposed on a cylindrical part constituting the housing, and an outline of a cross-section of the protruding portion orthogonal to an axial line of the cylindrical part goes along a tangential line that is drawn to an arc protruding outward in the radial direction and to an outer peripheral surface of the cylindrical part.

The protruding portion in the device to be mounted on the vehicle according to the present invention preferably serves as a projection that extends along the axial line of the cylindrical part.

Moreover, a device to be mounted on a vehicle according to the present invention includes: a housing having a cylindrical shape to be mounted on the vehicle, and for housing a device main body; and the device main body, and a protruding portion that protrudes outward in a radial direction is disposed on a cylindrical part constituting the housing, and the protruding portion is formed in a hemisphere-like shape or a substantially hemisphere-like shape.

The protruding portion in the device to be mounted on the vehicle according to the present invention preferably protrudes either in an identical direction to a traveling direction in which the vehicle travels, or in a direction pointing to the traveling direction.

In the device to be mounted on the vehicle according to the present invention, preferably, the device main body includes a compression mechanism configured to compress a coolant, and a motor configured to output a torque for causing the compression mechanism to operate, and the housing is integrally formed with a driver circuit unit configured to drive the motor.

The device to be mounted on the vehicle according to the present invention further includes a buffer member to be interposed between the device to be mounted on the vehicle and a member of the vehicle, and the protruding portion includes a support part configured to support the buffer member on the housing.

Advantageous Effects of Invention

Stress acting on the cylindrical part at the time of a vehicular collision can be dispersed by providing a protruding portion on the cylindrical part of the housing, such as an arc-like protruding portion, or a protruding portion having an outline along a tangential line drawn to a virtual arc and to the cylindrical part of the housing, or a hemisphere-like protruding portion, or the like. This avoids stress from being concentrated locally on the cylindrical part and reduces stress as a whole.

The shape of the protruding portion according to the present invention causes an increase in plate thickness only in the portion of the cylindrical part where the protruding portion is provided, while the stress dispersion makes it possible to obtain effects similar to the case where the plate thickness is increased across the entire circumference of the cylindrical part. Therefore, the strength of the housing against a vehicular collision is ensured without increasing the weight of the device to be mounted on the vehicle.

BRIEF DESCRIPTION OF DRAWINGS

FIG. 12B is a cross-sectional view along line b-b in FIG. 12A, and FIG. 12C is a cross-sectional view along line c-c in FIG. 12A.

DESCRIPTION OF EMBODIMENTS

Embodiments of the present invention will be described hereinafter with reference to the appended drawings.

First Embodiment

Figure 1A:
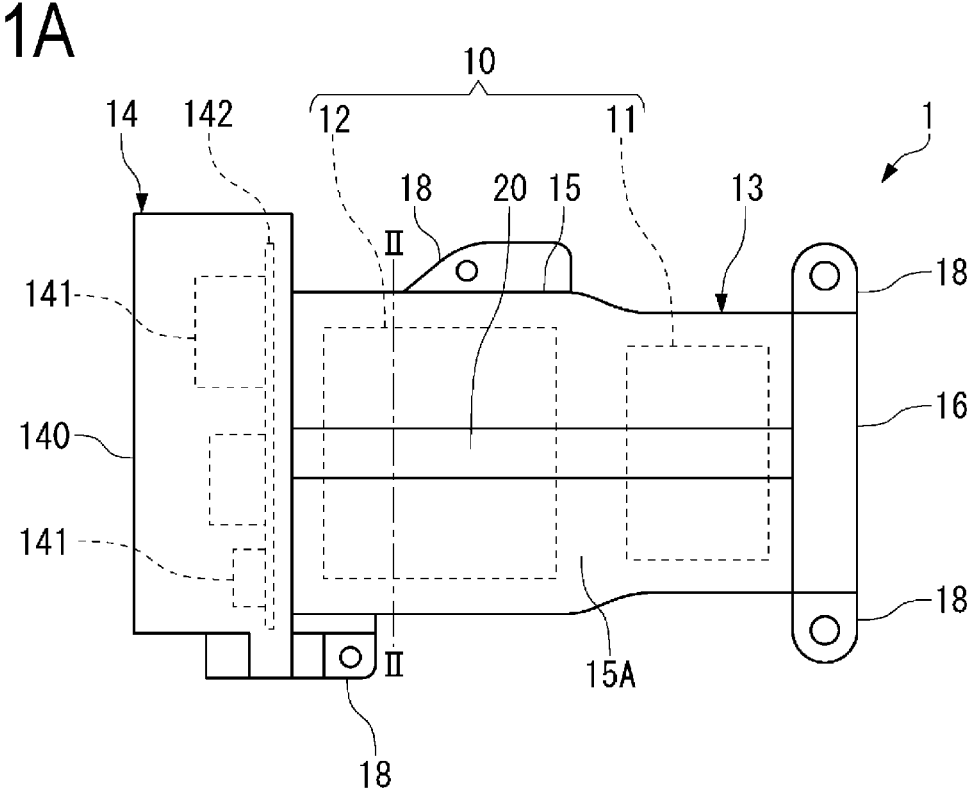
FIG. 1A is a side view of an electric compressor to be mounted on a vehicle in a first embodiment of the present invention.

A compressor 1 (electric compressor) illustrated in FIG. 1A is mounted on a vehicle such as an automobile and constitutes an air conditioner for the vehicle.

The compressor 1 includes: a device main body 10 including a compression mechanism 11 for compressing a coolant and a motor 12 for outputting torque that causes the compression mechanism 11 to operate; a housing 13 for housing the device main body 10; and a drive circuit unit 14 for driving the motor 12. The drive circuit unit 14 is integrated with the housing 13.

The compressor 1 is supported by a support member (not illustrated) of an engine mounted on the vehicle.

The housing 13 includes a cylindrically-shaped cylindrical part 15 surrounding the device main body 10, and a cover 16 provided on one end portion of the cylindrical part 15. The other end of the cylindrical part 15 is provided with a circuit casing 140 of the drive circuit unit 14.

The cylindrical part 15 and the cover 16 are provided with fixing portions 18 that fasten to a support member such as an engine.

The drive circuit unit 14 includes a circuit board 142 on which circuit elements 141 are mounted, and the circuit casing 140 for housing the circuit board 142.

The drive circuit unit 14 may be provided on the side surface section of the cylindrical part 15.

Once the vehicle has a collision while traveling, the structural body of the vehicle (such as a frame) may collide with the cylindrical part 15 from the side. Assuming that a load up to a maximum of dozens of tons in such a situation causes excessive deformation of the housing 13 and thus creates a gap between the cylindrical part 15 and the circuit casing 140, connectors or the like connected to high-voltage circuit components embedded in the drive circuit unit 14 will be exposed to outside, which is not desired.

Therefore, consideration is given to confer the cylindrical part 15 with a plate thickness that is sufficient to ensure strength against a collision. However, it would be necessary to ensure that the inside of the cylindrical part 15 has the volume demanded for the capabilities demanded of the compressor 1, and in addition, there are upper limits to the outer diameter of the compressor 1 due to constraints on the space where the compressor 1 is to be installed. Thus, it would be difficult to increase the plate thickness across the entire circumference of the cylindrical part 15. Increasing the plate thickness is also difficult due to a demand for the compressor 1 to have reduced weight.

Hence, in the present embodiment, a protruding portion 20 is formed on the cylindrical part 15, as will be described below, and thus the strength of the housing 13 is ensured against a collision and the like.

Figure 1B:
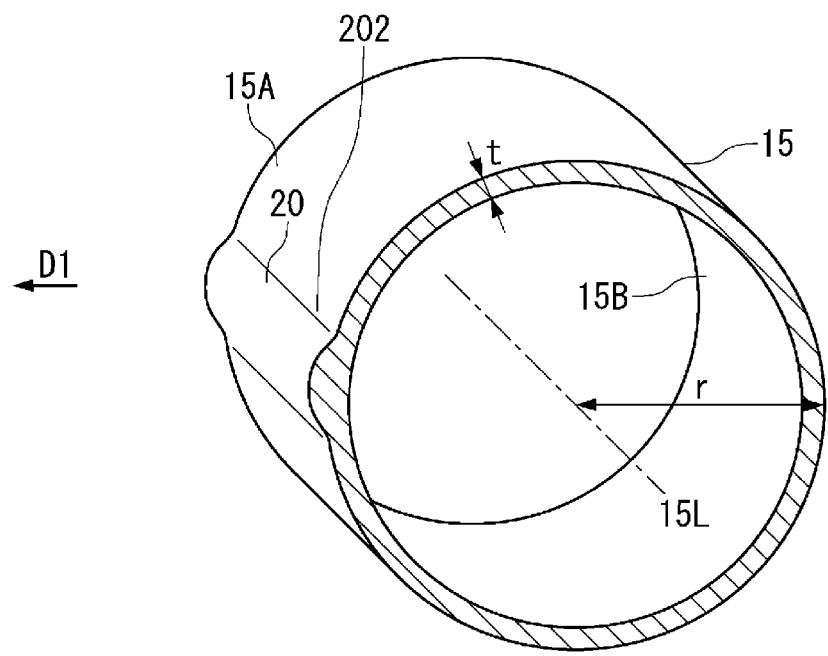
FIG. 1B is a perspective view of a cylindrical part of a housing of the electric compressor.
Figure 2:
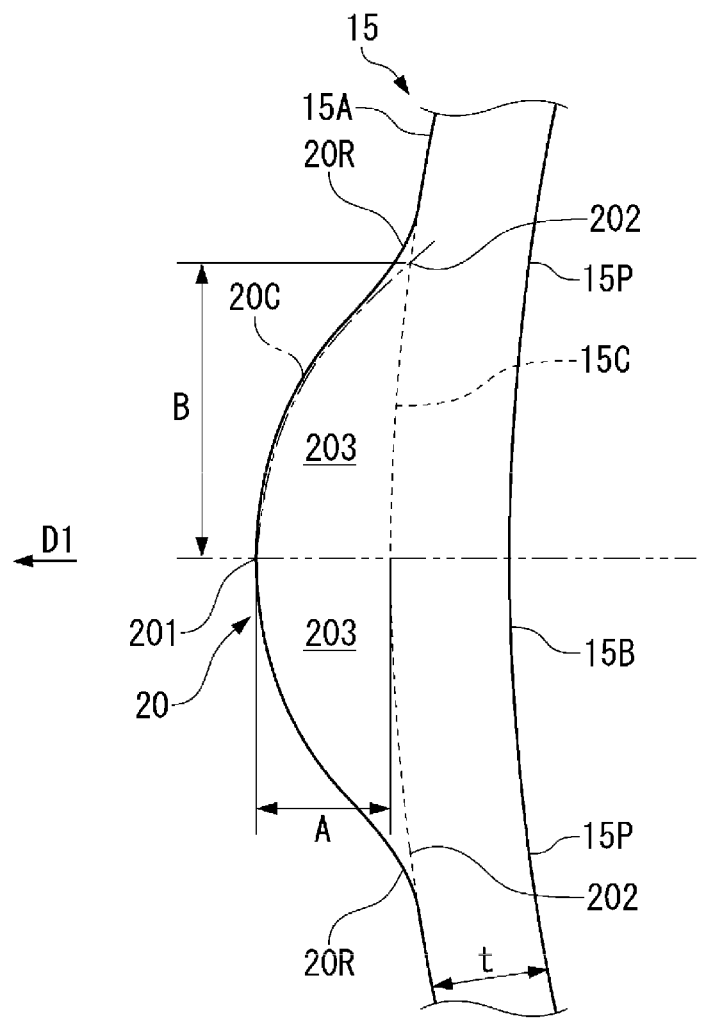
FIG. 2 illustrates a cross-section of an arc-like protruding portion formed on the cylindrical part of the housing (a cross-section along the II-II line in FIG. 1A).

As illustrated in FIG. 1B and FIG. 2, the protruding portion 20, which protrudes outward in a radial direction D1 of the cylindrical part 15, is provided on the cylindrical part 15. The protruding portion 20 may be arranged at least on one area in the circumferential direction of the cylindrical part 15.

The protruding portion 20 may protrude in the same direction in which the vehicle travels forward. More specifically, the protruding portion 20 is positioned in a horizontal plane or its vicinity including an axial line 15L of the cylindrical part 15.

The cylindrical part 15, including the protruding portion 20, is integrally formed by casting or die casting with a metallic material such as an aluminum alloy. The cylindrical part 15 is formed at a prescribed plate thickness t (wall thickness).

As illustrated in FIG. 2, the protruding portion 20 exhibits an arc-like cross-section, which protrudes outward in the radial direction D1. The cross-section is orthogonal to the axial line 15L of the cylindrical part 15. The external shape of the protruding portion 20 is determined on the basis of a single arc 20C and is formed with line symmetry about the center line (long dashed double-short dashed line) in the width direction.

The protruding portion 20 extends across approximately the entire length along the axial line 15L (FIG. 1B) of the cylindrical part 15. The same cross-section of the protruding portion 20 continues across the entirety of the length direction (the direction orthogonal to the sheet surface of FIG. 2) of the protruding portion 20 (projection).

Figure 3A:
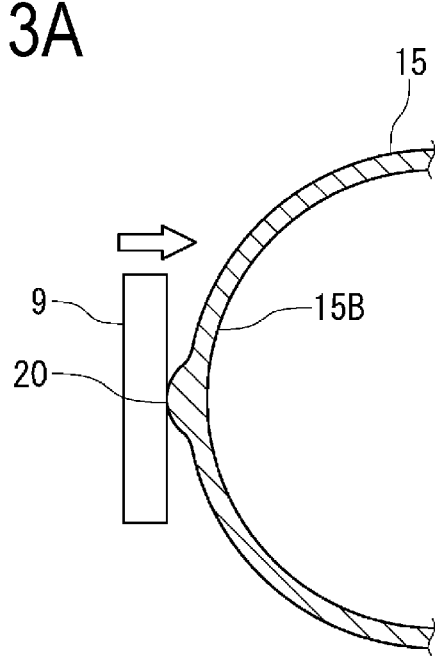
FIG. 3A is a schematic view illustrating a state in which a collision of a vehicle while traveling causes a member of the vehicle to collide with the cylindrical part of the housing.

As illustrated in FIG. 3, at a vehicle collision, the arc-like protruding portion 20 of the cylindrical part 15 is capable of receiving the load exerted by the member 9 of the vehicle positioned near the cylindrical part 15. The presence of the protruding portion 20 makes it possible to reduce tensile stress acting on the inner peripheral surface 15B positioned on the back of the protruding portion 20.

Figure 3B:
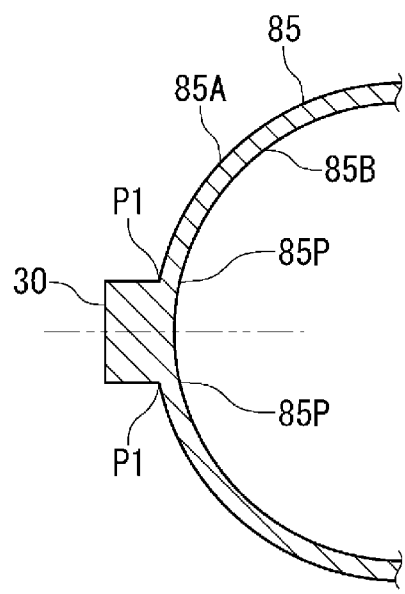
FIGS. 3B and 3C are each schematic view illustrating a cylindrical part on which a protruding portion that is not an arc-like shape has been formed.
Figure 3C:
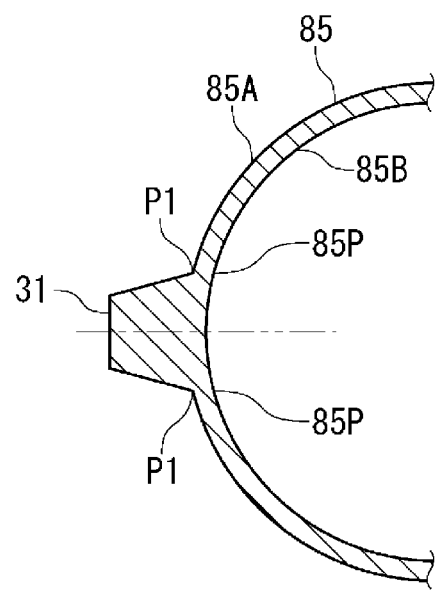

This will be described while comparing a case in which the protruding portion 20 is not arranged on the cylindrical part (FIG. 13B) with a case in which protruding portions 30 and 31 each having a non-arc shape have been arranged on the cylindrical part (FIGS. 3B and 3C).

Figure 13A:
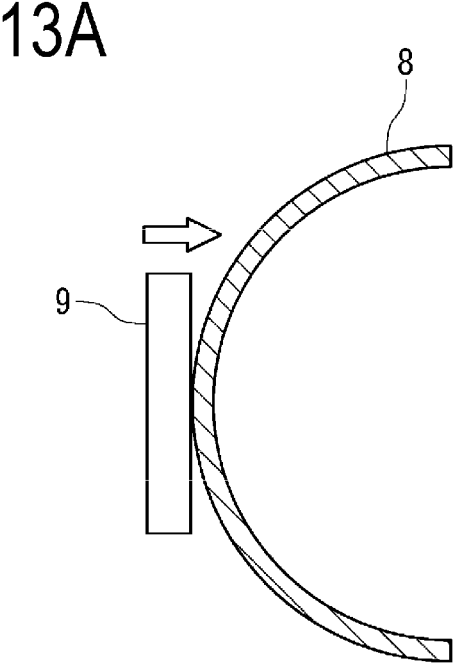
FIG. 13A illustrates a cylindrical part of a conventional compressor housing.
Figure 13B:
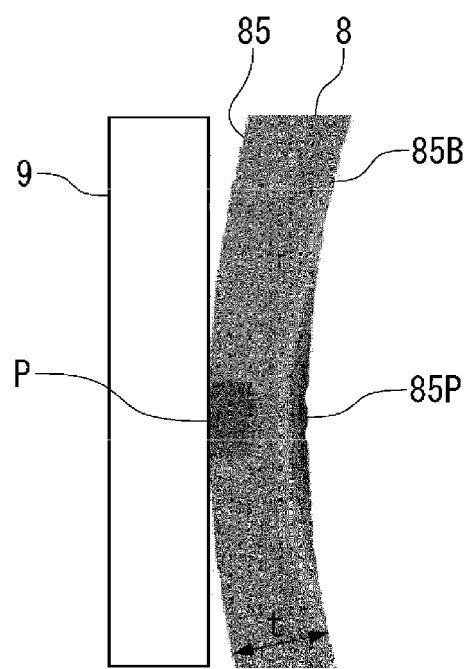
FIG. 13B illustrates the stress distribution when a member of a vehicle has collided with the cylindrical part of the housing.

As illustrated in FIG. 13B, in the case in which the protruding portion 20 is not provided, the plate thickness t of a cylindrical part 85 is uniform. Therefore, the rigidity of the cylindrical part 85 in the plate thickness direction (radial direction) is uniform in the circumferential direction.

Assuming that the member 9 of the vehicle collides with this cylindrical part 85, the load of the collision will cause stress to be generated at a collision portion P of the cylindrical part 85 in contact with the member 9 and the vicinity, and such stress will be transmitted in the plate thickness direction from the collision portion P. Hence, a large amount of stress will be generated at a portion 85P at an inner peripheral surface 85B of the cylindrical part 85. The portion 85P is positioned on the side opposite to the collision portion P in the plate thickness direction.

Furthermore, as illustrated in FIG. 3B, in a case where the protruding portion 30 is arranged on the cylindrical part 85, the plate thickness at the position of the protruding portion 30 will be greater than other portions. The protruding portion 30 is formed with a rectangular cross-section. In FIG. 3C as well, the plate thickness at the position where the protruding portion 31 with a trapezoidal cross-section is formed is greater than other portions.

The protruding portions 30 and 31 both rise in a direction normal to the outer peripheral surface 85A of the cylindrical part 85. Therefore, the rigidity of the cylindrical part 85 in the plate thickness direction changes sharply in the circumferential direction of the cylindrical part 85.

In such a case, assuming that the member 9 of the vehicle collides with the protruding portions 30 and 31, the protruding portions 30 and 31, which have higher rigidity than other portions, will cause portions P1 where the end edges of each of the protruding portions 30 and 31 are positioned to become high stress concentration areas. Thus, a large amount of stress, which is similar to a case in which no protruding portion is formed as illustrated in FIG. 13B, will still be generated on the inner circumferential side (85P) of the portions P1. The portion 85P correspond to an area where the plate thickness has changed.

The configurations of FIGS. 3B and 3C cannot reduce the tensile stress acting on the inner peripheral surface 85B of the cylindrical part 85, regardless of the plate thickness being increased.

In contrast, in the present embodiment (FIG. 2), the protruding portion 20 is formed in an arc-like shape. Therefore, even when the plate thickness is partially large, the rigidity in the plate thickness direction changes gradually in the circumferential direction in regions 203 from the width direction center of the protruding portion 20 (illustrated by the long dashed double-short dashed line) to end edges 202.

Therefore, assuming that the member 9 of the vehicle collides with the arc-like protruding portion 20 in the plate thickness direction, the stress will be dispersed across the entirety of the regions 203 of the protruding portion 20. The stress being dispersed in the circumferential direction in the regions 203 results in a reduction in tensile stress acting on the inner peripheral surface 15B of the cylindrical part 15, including the portions 15P on the rear side (inner peripheral surface 15B) of the end edges 202 of the protruding portion 20.

As explained above, the presence of the protruding portion 20, which protrudes in an arc-like shape from the outer peripheral surface 15A of the cylindrical part 15, can reduce the stress acting on the cylindrical part 15 at the time of a collision, and can ensure that the cylindrical part 15 is strong enough so as not to be deformed or damaged even at the time of the collision.

The protruding portion 20 may be arranged at least on one section of the cylindrical part 15 in the circumferential direction. Thus, unlike a case in which the plate thickness t is increased across the entire circumference of the cylindrical part 15, the reliability against a collision is improved while handling the capabilities demanded for the compressor 1 and the constraints on installation space, weight, etc.

The protruding portion 20 of the present embodiment continues across the entire length of the cylindrical part 15 in the axial line direction, and the rigidity of the protruding portion 20 in the plate thickness direction is approximately uniform in the axial direction of the cylindrical part 15. This makes it possible to disperse stress from the collision with the member 9 of the vehicle across the entirety of the length direction of the projection (protruding portion 20) and to reduce stress on the portions 15P on the inner peripheral surface 15B positioned on the rear side of the projection.

As described above, the presence of the arc-like protruding portion 20 reduces the stress acting on the cylindrical part 15 at the time of a collision more than a case in which the protruding portion 20 is not formed.

Other applicable shapes of the protruding portion 20 for reducing stress will be described below.

Figure 4:
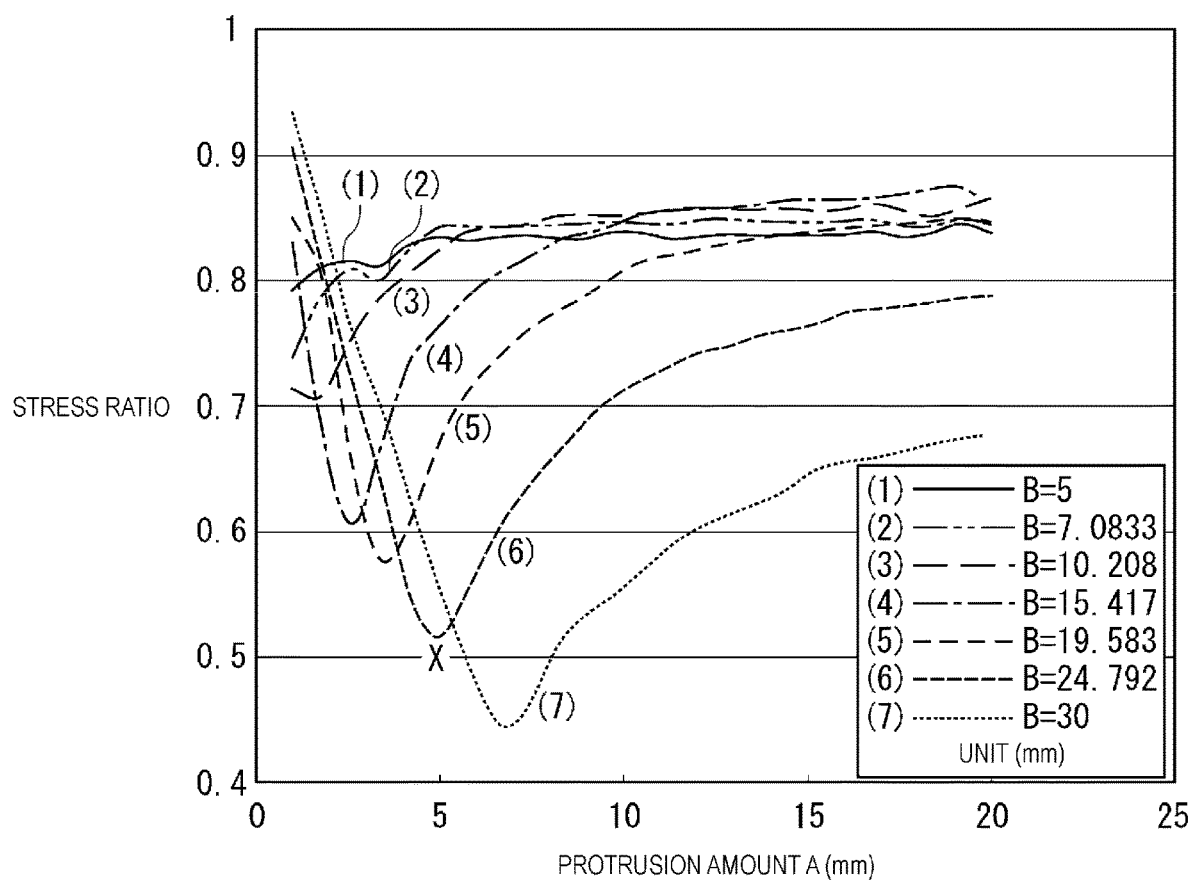
FIG. 4 illustrates the relationship among "B", which is a dimension (width) measured from a tip end of the protruding portion to a position of an end edge of the protruding portion in a tangential direction drawn to the tip end, "A", which is a protrusion amount of the protruding portion up to the tip end, and stress ratios, with (1) indicating a case in which no protruding portion is provided.

FIG. 4, which was obtained by analysis, illustrates relationships between a protruding portion amount A of the protruding portion 20 and stress ratios with respect to a width B of the protruding portion 20, where (1) indicates a stress ratio when no protruding portion is provided.

The radius r of the cylindrical part 15 (FIG. 1B) is set to approximately 60 mm, for example. The radius r of the cylindrical part 15 can also be set to approximately 40 mm to 80 mm, and in this case, the data would still be approximately the same as the data illustrated in FIG. 4.

The plate thickness t of the cylindrical part 15 is set to approximately 3.0 mm to 5.0 mm, for example. The plate thickness t can also be set to 2.0 mm to 7.0 mm. In this case also, the data would still be approximately the same as the data illustrated in FIG. 4.

As illustrated in FIG. 2, the protrusion amount A is the height to the tip end 201 (top) of the protruding portion 20 measured in the radial direction of the cylindrical part 15.

As illustrated in FIG. 2, the width B refers to the distance measured from the tip end 201 (top) of the protruding portion 20 to the position of the end edge 202 of the protruding portion 20 in the direction of a tangential line drawn to the tip end 20.

Here, the end edge 202 refers to a position where a circular arc 20C (long dashed single-short dashed line), which is the base shape determining the external shape of the protruding portion 20, intersects a circle 15C, which is the base shape of the outer peripheral surface 15A of the cylindrical part 15. An R part 20R, which has a predetermined radius of curvature, is formed at the interface portion between the end edge 202 of the protruding portion 20 and the outer peripheral surface 15A of the cylindrical part 15. In the data illustrated in FIG. 4, the radius of curvature of the R part 20R is approximately 5 mm.

Among (1) to (7) in FIG. 4, (6) will be described as an example. As the protrusion amount A is increased to 5 mm, the stress ratio gradually decreases. Thereafter, when a protrusion amount A exceeding 5 mm is given to the protruding portion 20, the stress ratio starts to rise. The point of inflection is indicated by X. The stress ratio is smallest when the protrusion amount A is approximately 5 mm. This is thought to be due to dispersion action by the region 203 of the protruding portion 20 being greatest at a protrusion amount A of approximately 5 mm.

The aforementioned is a tendency seen in all of (1) to (7). In other words, even when the width B differs, the stress reduction effect increases as the protrusion amount A increases up to a certain limit, and when the protrusion amount A exceeds the certain limit, the stress ratio increases.

Figure 5:
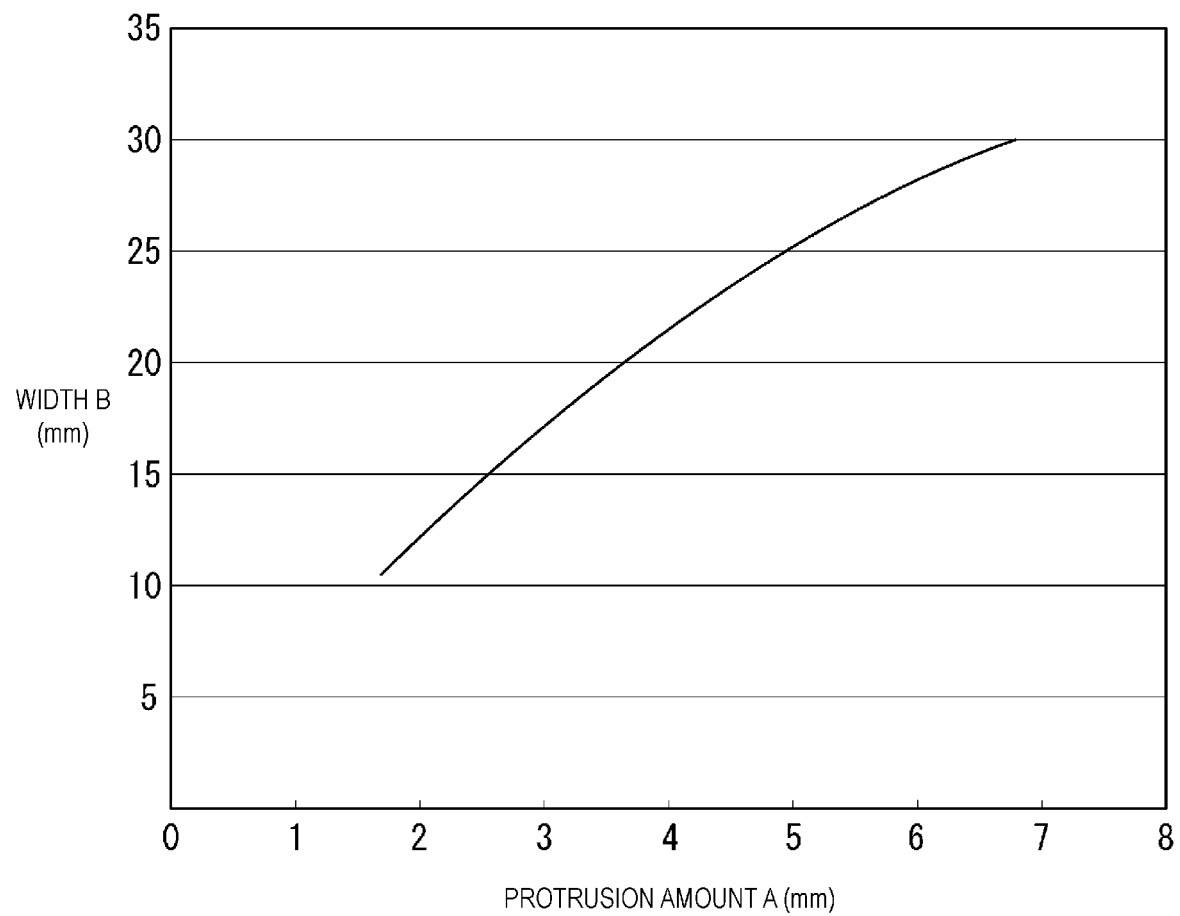
FIG. 5 is a graph illustrating the relationship between the protrusion amount "A" and the protruding portion width "B" when the stress ratios are smallest.

FIG. 5 is an approximation curve from data where each stress ratio of (1) to (7) in FIG. 4 is smallest. The width B can be expressed by a quadratic curve of the protrusion amount A.

It can be understood from FIG. 4 that, as the protrusion amount is increased, a wider width B makes it possible to arrive at a lower stress ratio, and the stress ratio is low even after the point of inflection has been exceeded. This is because increasing the width B while fixing the protrusion amount A results in a more gradual change in rigidity of the region 203 in the circumferential direction than fixing the width B while increasing the protrusion amount A. This indicates that the stress can be more fully dispersed. In other words, the width B has a greater effect on stress reduction than the protrusion amount A. Assuming that the area of the cross-section of the protruding portion 20 is the same, it is applicable for widening the width B than increasing the protrusion amount A, from the viewpoint of stress reduction.

As can be understood from the curve in FIG. 4, stress reduction effects are exhibited across a wide range of A and B. Stress reduction effects of up to at least 20% can be achieved for all the widths B of (1) to (7) via a suitable protrusion amount A. Significant stress reduction effects exceeding 40% can be achieved for (5) to (7) as compared to a case in which the protruding portion is not arranged.

In the foregoing, it is preferable that a ratio (B/A) of the width B to the protrusion amount A be from 4 to 7, both inclusive. This ratio makes it possible to achieve stress reduction effects of approximately 20% or greater, and thus can sufficiently ensure the strength of the cylindrical part 15.

Even though only a portion of the cylindrical part 15 in the circumferential direction is increased in plate thickness by the protruding portion 20, the stress dispersion action by the protruding portion 20 exhibits effects similar to the case where the plate thickness is increased across the entire circumference of the cylindrical part 15.

The protruding portion 20 may not strictly be an arc-like shape, but may be a substantially arc-like shape similar to an arc.

Figure 6A:
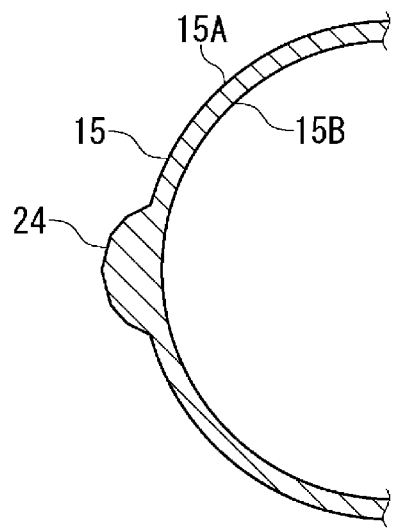
FIGS. 6A to 6C illustrate substantially arc-like protruding portions similar to an arc.
Figure 6B:
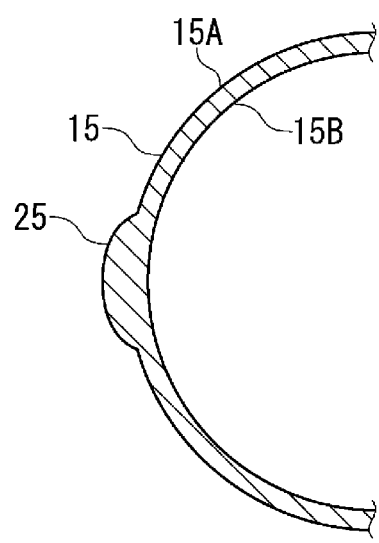
Figure 6C:
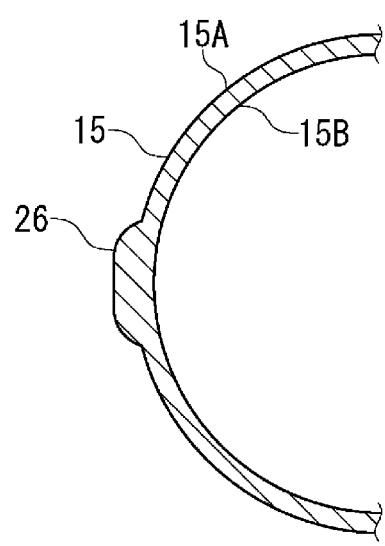

A protruding portion 24 having a polygonal shape simulating an arc as illustrated in FIG. 6A, a protruding portion 25 having an elliptical arc-like shape as illustrated in FIG. 6B, a protruding portion 26 having a long and round shape as illustrated in FIG. 6C, or the like may be applicable. In cases in which these protruding portions 24 to 26 are used, it is still possible to obtain data similar to the data described above (FIG. 4, FIG. 5) in regard to stress ratios, and to set a suitable protrusion amount A, width B, and the like, on the basis of the data.

A buffer member may be provided in the compressor 1, as preparation for a collision.

Figure 7:
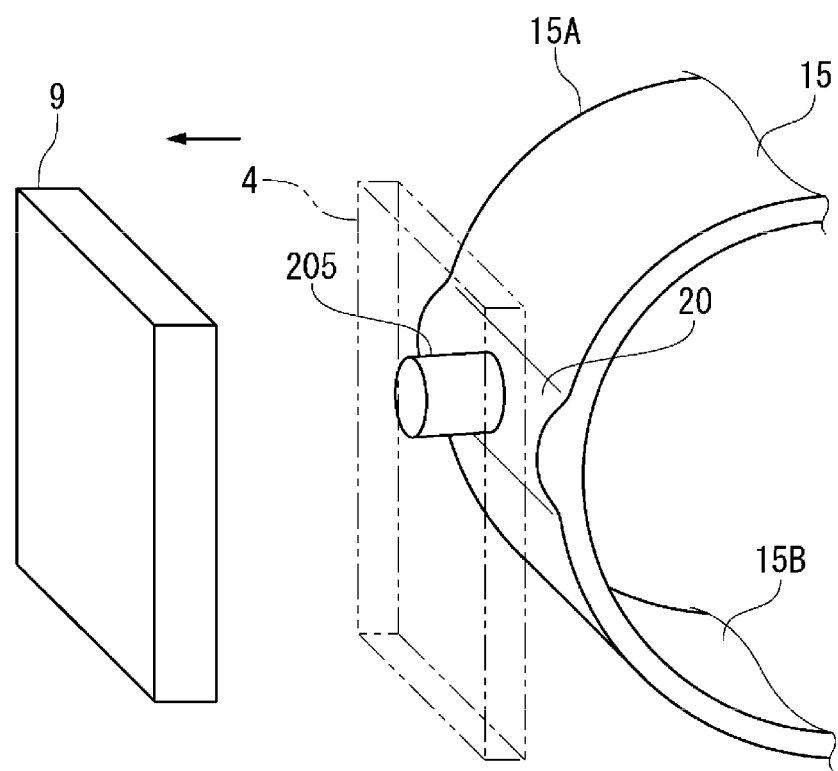
FIG. 7 is a perspective view of a cylindrical part of the housing of the electric compressor to which a buffer member has been provided.

FIG. 7 illustrates a buffer member 4 having a plate shape and interposed between the compressor 1 and the member 9 of the vehicle. The buffer member 4 is arranged with an upright attitude further in front than the compressor 1 in the traveling direction (the arrow) of the vehicle. The buffer member 4 is also preferably facing the drive circuit unit 14 (FIG. 1A).

Provision of the buffer member 4 in addition to the protruding portion 20 can cushion against impact loads exerted in the horizontal direction and the direction intersecting the horizontal direction. Thus, impacts exerted on the compressor 1 is also alleviated.

The protruding portion 20 can be used for supporting the buffer member 4 on the housing 13 of the compressor 1. In this example, a boss 205 is integrally formed with the tip end portion of the protruding portion 20, and the buffer member 4 is fastened to the boss 205.

The plate thickness of the cylindrical part 15 is increased at the position of the boss 205, and thus stress on the cylindrical part 15 is further reduced at the time of a collision.

Second Embodiment

Next, a second embodiment of the present invention will be described with reference to FIG. 8A to FIG. 9.

Differences from the first embodiment will be described below.

In the second embodiment, the shape of the protruding portion will be discussed from the viewpoint of the R part.

Figure 8A:
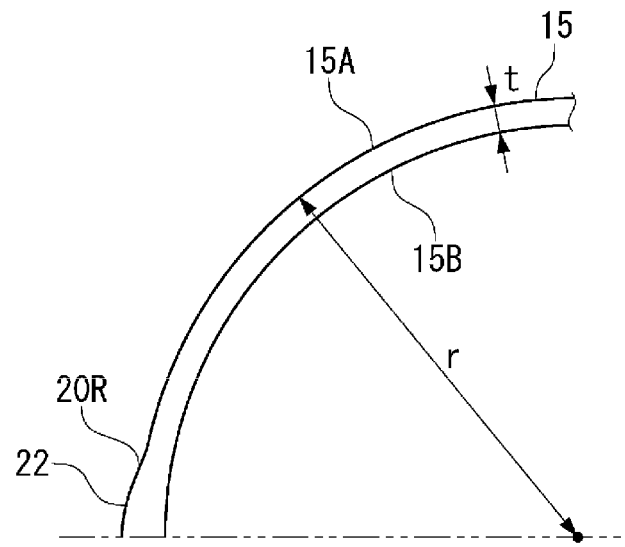
FIGS. 8A and 8B illustrate the housing of the electric compressor to be mounted on a vehicle in a second embodiment, with FIG. 8A illustrating a region that is ¼th of the cylindrical part of the housing, and FIG. 8B being an enlarged view of the protruding portion.
Figure 8B:
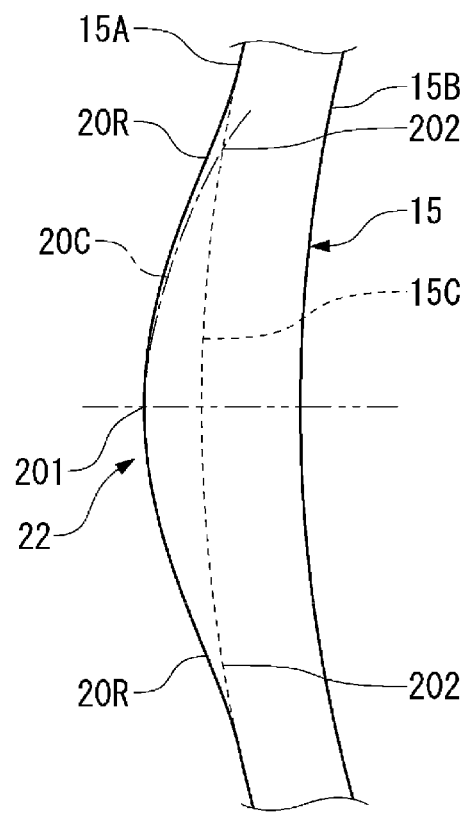

FIGS. 8A and 8B illustrate a protruding portion 22 arranged on the cylindrical part 15 of the second embodiment. The R part 20R is provided along a predetermined radius of curvature at the interface portion between the end edge 202 of the protruding portion 22 and the outer peripheral surface 15A of the cylindrical part 15.

The arc-like R part 20R smoothly connects the circular arc 20C (long dashed single-short dashed line) for defining the external shape of the protruding portion 22 and the circle 15C (dashed line), which is the basic shape of the outer peripheral surface 15A of the cylindrical part 15. The R part 20R is formed so as to protrude (inward in the radial direction) toward the inner peripheral side of the cylindrical part 15.

Figure 9:
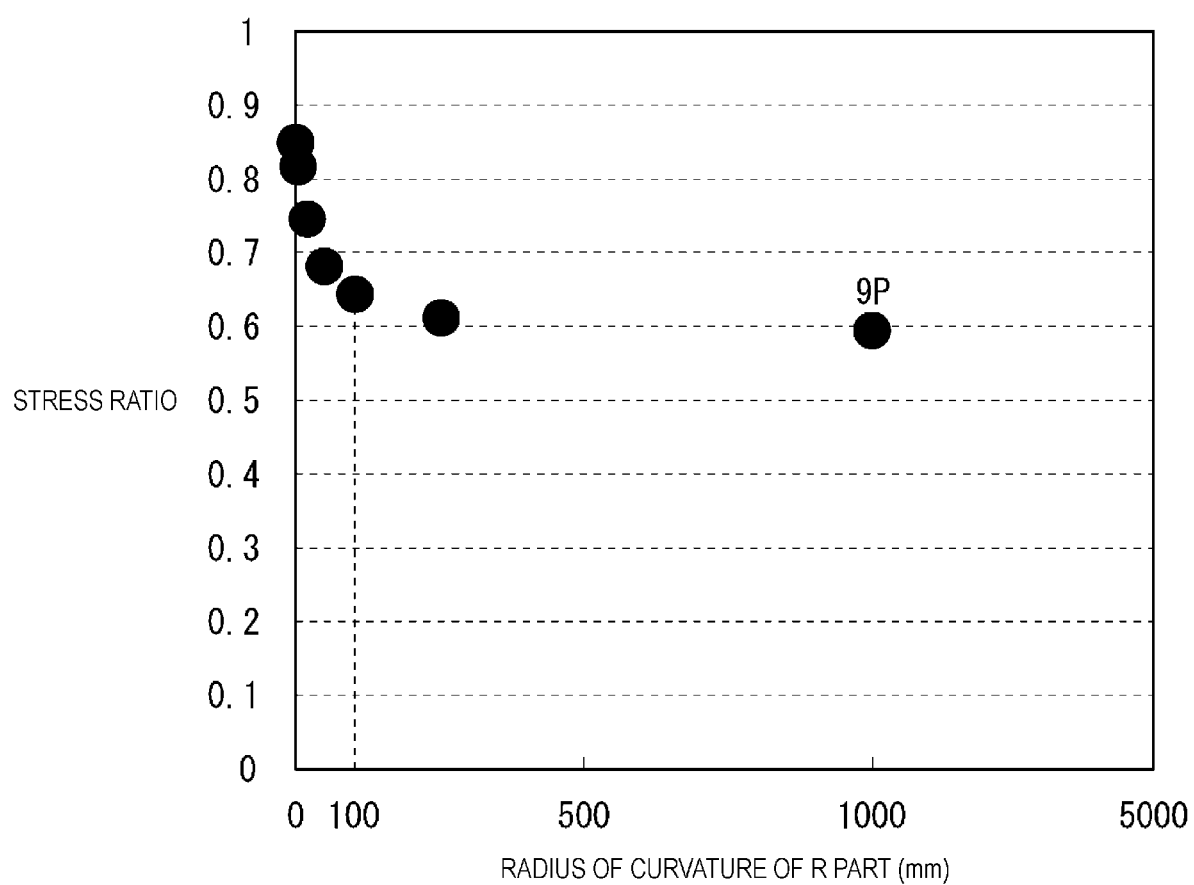
FIG. 9 illustrates the relationship between the radius of curvature of an R part at the base of the protruding portion and stress ratios, with 1 being a case in which no protruding portion is provided.

FIG. 9 illustrates, on the basis of analysis results, relationships between the radius of curvature of the R part 20R and stress ratios, while "1" indicates stress when the protruding portion 20 or protruding portion 22 is not formed.

From FIG. 9, it can be understood that the stress ratio rapidly decreases as the radius of curvature of the R part 20R gradually increases from approximately 5 mm.

The radius of curvature of the R part 20R alone is a large factor influencing the reduction of stress. Regardless of the values for the protrusion amount A and the width B of the arc-like protruding portion 20 or protruding portion 22, by providing a suitable R part 20R, the stress is dispersed to sufficiently reduce the stress on the cylindrical part 15.

From FIG. 9, it can be understood that the stress ratio is saturated lower when the radius of curvature exceeds 100 mm.

In the foregoing, the radius of curvature of the R part 20R is preferably set to 10 mm or greater, for example. The radius of curvature is more preferably 100 mm or greater.

Third Embodiment

In a third embodiment, the stress reduction effects achieved via the second embodiment are increased to the highest limits.

Figure 10:
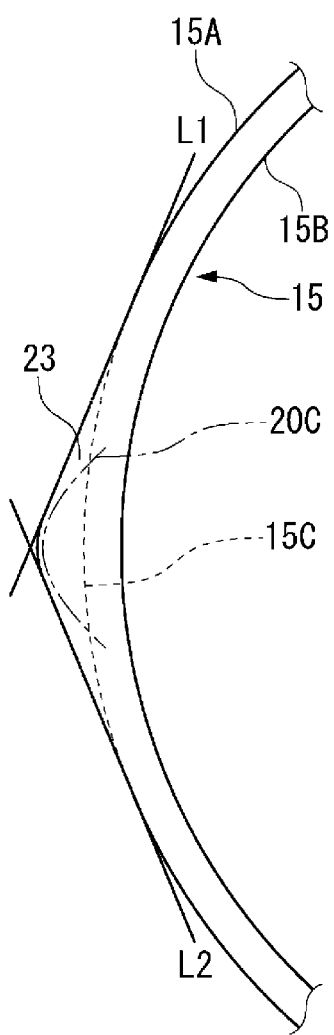
FIG. 10 illustrates the cylindrical part of the housing of an electric compressor to be mounted on a vehicle in a third embodiment.

As illustrated in FIG. 10, in a protruding portion 23 of the third embodiment, the outline of a cross-section orthogonal to the axial line of the cylindrical part 15 goes along two tangential lines L1 and L2.

The tangential line L1 is drawn to the arc 20C, which protrudes outward in the radial direction of the cylindrical part 15, and to the outer peripheral surface 15A of the cylindrical part 15. The same applies to the tangential line L2.

The protruding portion 23 of the third embodiment is provided along the arc 20C in the vicinity of an intersection of the tangential line L1 and tangential line L2.

The radius of curvature of the R part 20R of the protruding portion 22 in the second embodiment (FIG. 8) is increased to infinity, and then the R part 20R is formed substantially linearly along the tangential lines L1 and L2.

The plotted point 9P illustrated in FIG. 9 indicates the stress ratio when the R part 20R is formed substantially corresponding to the tangential lines L1 and L2, which connect the arc 20C of the protruding portion 20 and the outer peripheral surface 15A of the cylindrical part 15.

The protruding portion 23 of the third embodiment largely reduces stress acting on the cylindrical part 15, in a similar manner as indicated by the plotted point 9P.

The top of the protruding portion 23 may not necessarily be arranged along the arc 20C, but can rather be formed along the circle 15C, which is the basic shape of the outer peripheral surface 15A of the cylindrical part 15, or can be formed flat.

Figure 11:
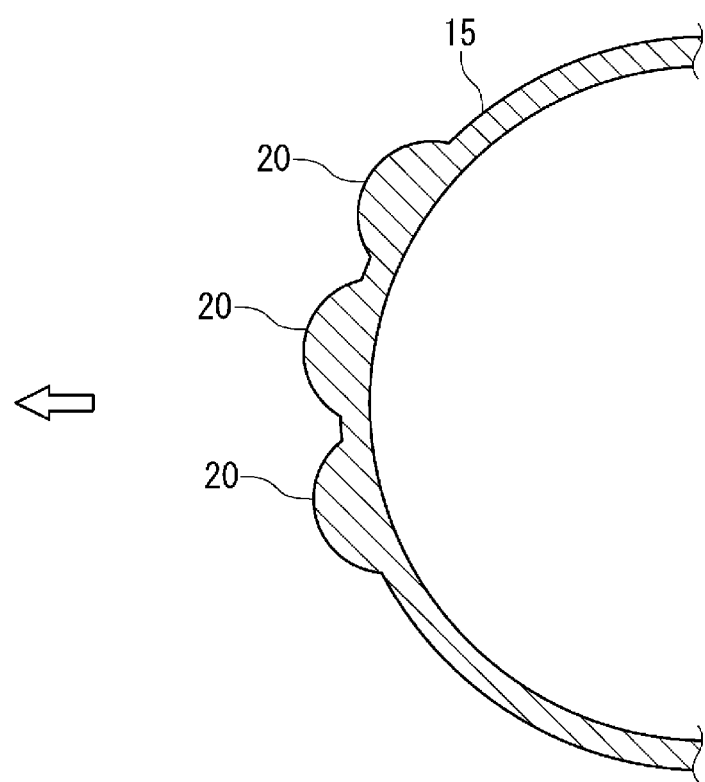
FIG. 11 illustrates the cylindrical part of the housing of an electric compressor to be mounted on a vehicle in a variation of the present invention.

In the respective embodiments above, a plurality of the protruding portions (20, etc.) can also be formed on the cylindrical part 15 of the housing, as illustrated in FIG. 11. These protruding portions 20 are arranged with a gap in alignment with each other in the circumferential direction of the cylindrical part 15. These protruding portions 20 all protrude in a direction pointing to the traveling direction of the vehicle (the white solid arrow), and can disperse stress at the time of a collision in order to reduce the stress on the cylindrical part 15.

Fourth Embodiment

Next, a fourth embodiment of the present invention will be described with reference to FIGS. 12A to 12C.

Figure 12A:
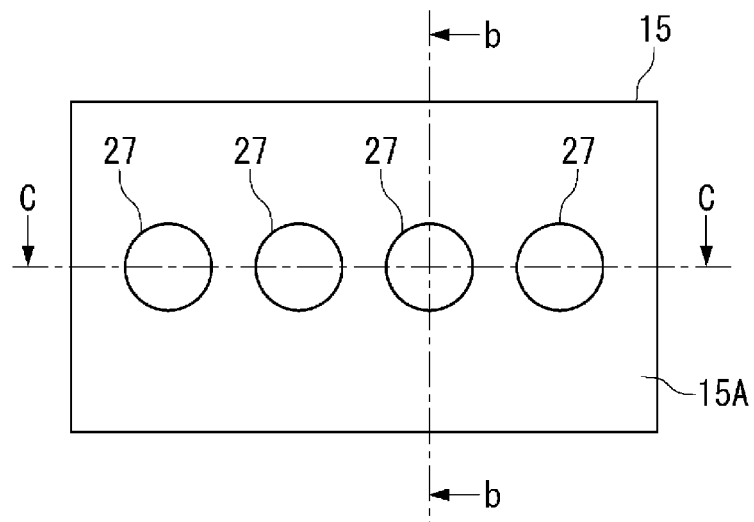
FIGS. 12A to 12C illustrate the cylindrical part of the housing of a compressor housing of the fourth embodiment.

FIG. 12A is a side view of the cylindrical part 15 constituting a housing of an electric compressor of the fourth embodiment. A plurality of protruding portions 27, which protrude outward in the radial direction, are provided on the cylindrical part 15. The plurality of protruding portions 27 are each arranged with a gap in the axial line direction of the cylindrical part 15. The protruding portions 27 all protrude in the same direction as the traveling direction of the vehicle.

Figure 12B:
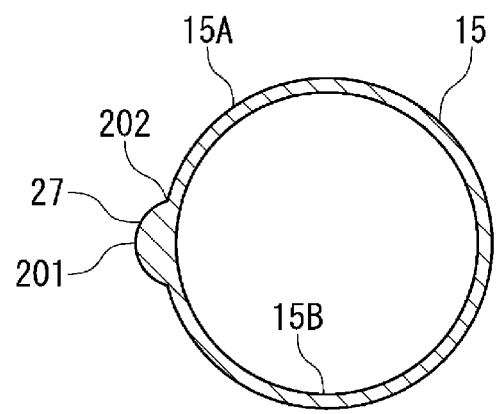
Figure 12C:
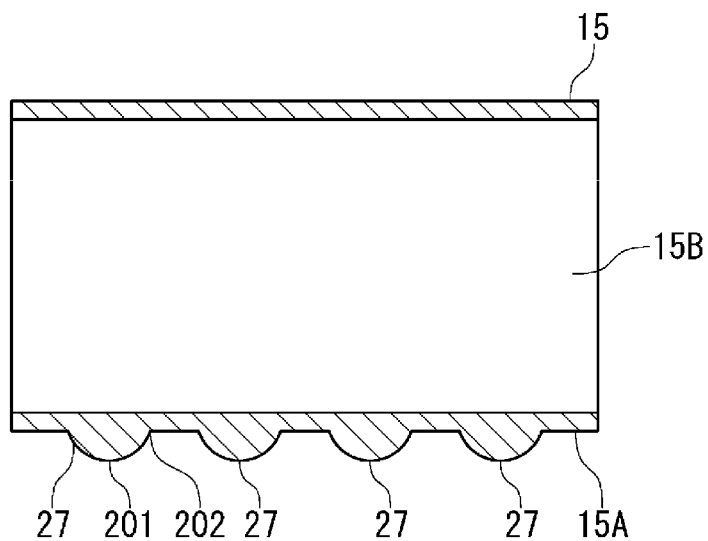

As illustrated in FIGS. 12B and 12C, each of the protruding portions 27 protrudes in a hemisphere-like shape from the outer peripheral surface 15A of the cylindrical part 15. The "hemisphere-like shape" may be less than or equal to half a sphere, or may be more than half a sphere. As illustrated in FIG. 12B, a cross-section of the protruding portion 27 along the axial line of the cylindrical part 15 exhibits an arc-like shape that protrudes outward in the radial direction. As illustrated in FIG. 12C, a cross section of the protruding portion 27 parallel to the axial line of the cylindrical part 15 also exhibits an arc-like shape protruding outward in the radial direction.

The cross-section of the protruding portion 27 may not strictly be an arc-like shape, but may be a substantially arc-like shape similar to an arc. For example, the cross-section of the protruding portion 27 may have a polygonal shape simulating an arc as illustrated in FIG. 6A, an elliptical arc-like shape as illustrated in FIG. 6B, a long and round shape as illustrated in FIG. 6C, or the like. In other words, the protruding portion 27 is not limited to a hemisphere-like shape, and may be a substantially hemisphere-like shape, which includes shapes similar to an oval shape, egg shape, etc.

The cylindrical part 15, including the plurality of protruding portions 27, can be integrally formed by casting or die casting with a metallic material, such as an aluminum alloy.

The R part may be preferably formed at the interface portion between the end edge 202 of each of the protruding portions 27 and the outer peripheral surface 15A of the cylindrical part 15.

The protruding portion 27 is formed in a hemisphere-like shape, and thus the rigidity of the cylindrical part 15 in the plate thickness direction gradually changes in all directions from the tip end 201 (top) of the protruding portion 27 to the end edge 202 surrounding the top. For example, the rigidity of the cylindrical part 15 in the plate thickness direction gradually changes not only in the circumferential direction of the cylindrical part 15 illustrated in FIG. 12B, but also in the axial line direction of the cylindrical part 15 illustrated in FIG. 12C. Accordingly, at the time of a collision, stress will not be concentrated at portions between protruding portions 27 that are adjacent to each other in the axial direction of the cylindrical part 15, but rather the stress can be dispersed across the entirety of the protruding portions 27. Therefore, the stress on the cylindrical part 15 is reduced.

In the example illustrated in FIGS. 12A to 12C, a plurality of the protruding portions 27 are arranged in a row along the axial line direction of the cylindrical part 15, but the plurality of protruding portions 27 may be in a plurality of rows along the axial line direction of the cylindrical part 15.

Alternatively, the plurality of protruding portions 27 may be arranged in a staggered pattern on both sides of a linear line set in parallel to the axial line direction on the outer peripheral surface 15A of the cylindrical part 15.

According to the respective embodiments described above, effects similar to the case where the plate thickness is increased across the entire circumference of the cylindrical part 15 are achievable by forming, on the cylindrical part 15, the arc-like protruding portions 20 and 22, or the protruding portion 23 having the outline along the tangential lines L1 and L2, or the hemisphere-like protruding portions 27, or the like. Therefore, the strength of the housing 13 of the compressor 1 is ensured against a collision while the vehicle is traveling.

In addition to the above-described embodiments, as long as there is no departure from the spirit and scope of the present invention, configurations explained in the above-described embodiments can be selected as desired, or can be changed to other configurations as necessary.

In addition to electric compressors, the present invention can also be applied to devices to be mounted on vehicles, for which the strength of the housing is ensured against a collision is demanded.

REFERENCE SIGNS LIST

1 Electric compressor (a device to be mounted on a vehicle)
4 Buffer member
8 Housing
9 Member of vehicle
10 Device main body
11 Compression mechanism
12 Motor
13 Housing
14 Drive circuit unit
15 Cylindrical part
15A Outer peripheral surface
15B Inner peripheral surface
15L Axial line
15P Portion
16 Cover
18 Fixing portion
20, 22 to 26 Protruding portion
20C Arc
20R R part
30, 31 Protruding portion
85 Cylindrical part
85A Outer peripheral surface
85B Inner peripheral surface
85P Portion
140 Circuit casing
141 Circuit element
142 Circuit board
201 Tip end
202 End edge
203 Region
205 Boss
A Protrusion amount
B Width
D1 Outward in radial direction
L1, L2 Tangential line
P Collision portion
P1 Portion

The invention claimed is:

1. An electric compressor comprising:
a housing to be mounted on a vehicle, and for housing a device main body, the device main body comprising a compression mechanism and a motor configured to output a torque for causing the compression mechanism to operate, the housing including a cylindrically-shaped cylindrical part surrounding the device main body; and
the device main body, wherein
a solid projection that protrudes outward in a radial direction is disposed on the cylindrical part,
the cylindrical part including the projection comprises a metallic material,
a wall thickness of the cylindrical part is increased at a position of the projection,
a cross-section of the projection orthogonal to an axial line of the cylindrical part exhibits an arc-like shape or a substantially arc-like shape that protrudes outward in the radial direction,
a length direction of the projection is the same as a direction of the axial line,
the wall thickness of the cylindrical part in a region from a center of the projection in a circumferential direction of the cylindrical part through respective end edges changes gradually in the circumferential direction, wherein the end edges refer to positions in the circumferential direction where a circular arc, which is a base shape determining an external shape of the projection, intersects a circle, which is a base shape of an outer peripheral surface of the cylindrical part,
the projection protrudes either in an identical direction to a traveling direction in which the vehicle travels and a location of a member of the vehicle, or in a direction pointing to the traveling direction and the location of the member of the vehicle,
when the electric compressor is attached to the vehicle, the projection protrudes in a traveling direction of the vehicle and the projection directly opposes the member of the vehicle, such that the member makes contact with the projection upon a vehicle collision, and
the device further comprising:
a buffer member to be interposed between the electric compressor and the member of the vehicle,
wherein the projection includes a support part configured to support the buffer member on the housing.

2. The electric compressor according to claim 1, wherein B/A is from 4 to 7, both inclusive, where A is a height to a tip end of the projection measured in the radial direction of the cylindrical part, and B is a distance measured from the tip end of the projection to a position of one of the end edges of the projection in a direction of a tangential line drawn to the tip end.

3. The electric compressor according to claim 1, wherein an interface portion between one of the end edges of the projection and the outer peripheral surface of the cylindrical part includes an R part having an arc-like shape that protrudes toward an inner peripheral side of the cylindrical part.

4. The electric compressor according to claim 3, wherein
a radius of the cylindrical part is from 40 mm to 80 mm, both inclusive, and
a radius of curvature of the R part is equal to or greater than 10 mm.

5. The electric compressor according to claim 1, wherein the projection extends along the axial line of the cylindrical part.

6. The electric compressor according to claim 1, wherein the compression mechanism is configured to compress a coolant and the housing is integrally formed with a driver circuit unit configured to drive the motor.

7. The electric compressor according to claim 2, wherein an interface portion between one of the end edges of the projection and the outer peripheral surface of the cylindrical part includes an R part having an arc-like shape that protrudes toward an inner peripheral side of the cylindrical part.

8. The electric compressor according to claim 7, wherein
a radius of the cylindrical part is from 40 mm to 80 mm, both inclusive, and
a radius of curvature of the R part is equal to or greater than 10 mm.

9. An electric compressor comprising:
a housing to be mounted on a vehicle, and for housing a device main body, the device main body comprising a compression mechanism and a motor configured to output a torque for causing the compression mechanism to operate, the housing including a cylindrically-shaped cylindrical part surrounding the device main body; and
the device main body, wherein
a solid projection that protrudes outward in a radial direction is disposed on the cylindrical part,
the cylindrical part including the projection comprises a metallic material,
a wall thickness of the cylindrical part is increased at a position of the projection,
an outline of a cross-section of the projection orthogonal to an axial line of the cylindrical part goes along tangential lines that are drawn, in a circumferential direction of the cylindrical part, to an arc of the projection protruding outward in the radial direction and to an outer peripheral surface of the cylindrical part, the projection provided along the arc in the vicinity of an intersection of the tangential lines,
a length direction of the projection is the same as a direction of the axial line,
the projection protrudes either in an identical direction to a traveling direction in which the vehicle travels and a location of a member of the vehicle, or in a direction pointing to the traveling direction and the location of the member of the vehicle,
when the electric compressor is attached to the vehicle, the projection protrudes in a traveling direction of the vehicle and the projection directly opposes the member of the vehicle, such that the member makes contact with the projection upon a vehicle collision, and
the device further comprising:
a buffer member to be interposed between the electric compressor and the member of the vehicle,
wherein the projection includes a support part configured to support the buffer member on the housing.

10. The electric compressor according to claim 9, wherein the projection extends along the axial line of the cylindrical part.

11. The electric compressor according to claim 9, wherein
the compression mechanism is configured to compress a coolant, and
the housing is integrally formed with a driver circuit unit configured to drive the motor.

12. An electric compressor comprising:
a housing to be mounted on a vehicle, and for housing a device main body, the device main body comprising a compression mechanism and a motor configured to output a torque for causing the compression mechanism to operate, the housing including a cylindrically-shaped cylindrical part surrounding the device main body; and
the device main body, wherein
a solid protruding portion that protrudes outward in a radial direction is disposed on the cylindrical part,
the cylindrical part including the protruding portion comprises a metallic material,
a wall thickness of the cylindrical part is increased at a position of the protruding portion, the protruding portion is formed in a hemisphere-like shape or a substantially hemisphere-like shape,
the wall thickness of the cylindrical part gradually changes from a tip end of the protruding portion to an end edge of the protruding portion in circumferential and axial line directions of the cylindrical part, wherein the end edge refers to a position where a circular arc, which is a base shape determining an external shape of the protruding portion, intersects a circle, which is a base shape of an outer peripheral surface of the cylindrical part,
and
the protruding portion protrudes either in an identical direction to a traveling direction in which the vehicle travels, or in a direction pointing to the traveling direction.

13. The electric compressor according to claim 12, wherein
the compression mechanism is configured to compress a coolant, and
the housing is integrally formed with a driver circuit unit configured to drive the motor.

14. The electric compressor according to claim 12, the device further comprising:
a buffer member to be interposed between the electric compressor and a member of the vehicle,
wherein the protruding portion includes a support part configured to support the buffer member on the housing.

15. The electric compressor according to claim 12, wherein the protruding portion is one of a plurality of protruding portions disposed on the cylindrical part, and the plurality of protruding portions are arranged in a row along the axial line direction of the cylindrical part or in a plurality of rows along the axial line direction of the cylindrical part.

16. An electric compressor comprising:
a housing to be mounted on a vehicle, and for housing a device main body, the device main body comprising a compression mechanism and a motor configured to output a torque for causing the compression mechanism to operate, the housing including a cylindrically-shaped cylindrical part surrounding the device main body; and
the device main body, wherein
a solid projection that protrudes outward in a radial direction is disposed on the cylindrical part,
a wall thickness of the housing is increased at a position of the projection, a cross-section of the projection orthogonal to an axial line of the cylindrical part exhibits an arc-like shape or a substantially arc-like shape that protrudes outward in the radial direction, a length direction of the projection is the same as a direction of the axial line, and
the projection protrudes either in an identical direction to a traveling direction in which the vehicle travels, or in a direction pointing to the traveling direction,
the device further comprising:
a buffer member to be interposed between the electric compressor and a member of the vehicle,
wherein the projection includes a support part configured to support the buffer member on the housing.

17. An electric compressor comprising:
a housing to be mounted on a vehicle, and for housing a device main body, the device main body comprising a compression mechanism and a motor configured to output a torque for causing the compression mechanism to operate, the housing including a cylindrically-shaped cylindrical part surrounding the device main body; and
the device main body, wherein
a solid projection that protrudes outward in a radial direction is disposed on the cylindrical part,
a wall thickness of the housing is increased at a position of the projection,
an outline of a cross-section of the projection orthogonal to an axial line of the cylindrical part goes along tangential lines that are drawn to an arc of the projection protruding outward in the radial direction and to an outer peripheral surface of the cylindrical part,
a length direction of the projection is the same as a direction of the axial line, and the projection protrudes either in an identical direction to a traveling direction in which the vehicle travels, or in a direction pointing to the traveling direction,
the device further comprising:
a buffer member to be interposed between the electric compressor and a member of the vehicle,
wherein the projection includes a support part configured to support the buffer member on the housing.

* * * * *